United States Patent [19]
Nimberger

[11] Patent Number: 5,720,317
[45] Date of Patent: Feb. 24, 1998

[54] LOW PROFILE FLANGED MANIFOLD VALVE

[75] Inventor: Spencer M. Nimberger, Houston, Tex.

[73] Assignee: PGI International, Ltd., Houston, Tex.

[21] Appl. No.: 700,813

[22] Filed: Aug. 21, 1996

[51] Int. Cl.$^6$ ........................................ F16K 11/20
[52] U.S. Cl. ........................ 137/597; 137/884; 137/557
[58] Field of Search ................................ 137/597, 884, 137/594, 552, 557

[56] References Cited

U.S. PATENT DOCUMENTS

| | | | |
|---|---|---|---|
| 1,797,591 | 3/1931 | Sartakoff | 137/597 |
| 2,871,881 | 2/1959 | Hewson | 137/597 |
| 5,036,884 | 8/1991 | Miller | 137/597 |
| 5,277,224 | 1/1994 | Hutton | 137/597 |
| 5,449,294 | 9/1995 | Rench | 137/597 |

OTHER PUBLICATIONS

Agco Manifolds Anderson, Greenwood & Co. Catalog 3000 Revised Oct. 1980.

*Primary Examiner*—Denise L. Ferensic
*Assistant Examiner*—Ramyar Farid
*Attorney, Agent, or Firm*—Jenkens & Gilchrist

[57] ABSTRACT

A five valve flanged manifold valve in a straight-flow configuration has a height that is less than 25 percent greater than it width, and in 90° angled flow configuration is less than 50 percent greater than its width. A vent pert is advantageously positioned on the front face of the valve in both configurations. A vent pert control valve is located a rear surface of the straight flow configuration manifold valve, and on a bottom surface of the 90° flow configuration manifold valve. Neither configuration of the manifold valve requires a separate access hole for use during manufacture to form and shape the internal crossflow passageways. Both configurations have significantly less mass than the counterpart prior valves of their respective types.

5 Claims, 5 Drawing Sheets

LOW PROFILE FLANGED MANIFOLD VALVE

This application claims priority of provisional patent application Ser. No. 60/003,606, filed Sep. 12, 1995.

BACKGROUND OF THE INVENTION

1. Field of the Invention

This invention relates generally to manifold valves and more particularly to manifold valves having a multiple valve body with process and instrument flanges integrally formed with the body.

2. Description of the Related Art

Multiple valve flanged manifolds are widely used in the chemical processing, petroleum refining and other fluid process industries. In particular, five valve manifolds are often used to control the flow of pressurized fluid from two pressure sources to a pressure transmitter for the purpose of measuring fluid flow rates in the process system. Heretofore, such valves typically had three valves mounted on the face of the valve, e.g., two crossover valves and a vent valve, and two isolation, or blocking, valves each mounted on a separate side surface of the valve.

The width of such five valve flanged manifold valves is generally determined by the width of one, or both, of the flanges. The flanges are shaped to provide appropriate mating surfaces for mounting the manifold valve to a process system, i.e., on the process flange, and a measurement instrument to the manifold, i.e., the instrument flange. The body portion of the manifold valve in the prior arrangements required sufficient height to house the three flow control valves mounted on the face surface and, consequently, prior valves of this type were relatively tall. For example, five valve straight-flow flanged manifolds having vertically aligned, but sometimes laterally offset, inlet and outlet ports typically have a height that is at least 50 percent greater than the width of the valve. Likewise, 90° five valve flanged manifolds are typically on the order of at least 75% greater in height than in width. Furthermore, the prior five valve flanged manifolds require an operationally nonfunctional access hole in the body portion to provide manufacturing access for forming the cross and vent passages which communicate, either directly or indirectly, with the main flow passageways in the valve. In order to seal the access hole after construction, it was typically tapped and sealed with a pipe plug. The drilling, tapping and sealing of the construction access hole added cost to the manufacture of such valves and produced a potential source of leakage around the threaded plug.

Also, the height requirements of the body portion in the prior construction was a significant contributor to the cost of manufacturing the valve. Valves of the type described above are generally formed of metal such as stainless steel or other corrosion-resistant alloy. The rough blank from which such valves are machined is typically formed by casting, or by cutting an extruded shape to a required length. Regardless of whether the valve blank is cast or extruded, the cross-sectional area of the blank is a major determinate of the quantity of material required to form the blank and, accordingly, is a significant contributor to the total cost of manufacturing the valve. The amount of material required to form the blank from which the manifold valve is machined is particularly significant when it is formed of stainless steel or other relatively high-priced alloy.

The present invention is directed to overcoming the problems set forth above. It is desirable to have compact, ranged, multiple valve manifold that does not require the formation and sealing of operationally superfluous holes in the valve body. It is also desirable to have such a manifold valve that has a significantly lower height to width ratio whereby the cross-sectional area of the valve is markedly shrunk and the amount of metal required to form the valve blank is substantially reduced.

SUMMARY OF THE INVENTION

In accordance with one aspect of the present invention, a manifold valve has a body portion that has front, rear, and two side surfaces that are disposed in a mutually parallel relationship, and a least five flow control valves operatively arranged within the body portion. The manifold valve aim has a process flange and an instrument flange, both of which are integrally formed with the body portion. The process flange has a substantially planar surface with first and second inlet ports located therein, and a width that extends in a direction parallel with the side surfaces and perpendicular to the front surface of the body portion, and defines the width of the manifold valve. The instrument flange has a substantially planar surface that has first and second outlet ports located therein and is disposed in substantially parallel relationship with the planar surface of the process flange, the spaced relationship of the planar surfaces defining the height of the manifold valve. The height of the manifold valve is less than 25 percent greater than its width.

In another aspect of the present invention, a manifold valve has a body portion with front, bottom, and two side surfaces disposed in substantially parallel relationship with each other, and at least five flow control valves operatively arranged within the body portion. The manifold valve also has a process flange and an instrument flange integrally formed with the body portion. The process flange has a substantially planar surface with first and second inlet ports positioned therein, and a lower surface disposed in parallel spaced relationship with respect to the bottom surface of the body portion. The instrument flange has a substantially planar surface with first and second outlet ports located therein and which is disposed in an orthogonal relationship with the planar surface of the process flange at a spaced distance from the lower surface of the process flange. The spaced distance between the planar surface of the instrument flange and the lower surface of the process flange defines the height of the manifold valve. The instrument flange has width extending in a direction parallel with the side surfaces and perpendicular to the front surface of the body portion which defines the width of the manifold valve. The height of the manifold valve is less than 50 percent greater than its width.

DESCRIPTION OF THE PREFERRED EMBODIMENTS

The inventor of the present invention has discovered that by repositioning the conventional location of the vent passage control valve from the face surface of fivevalve flanged manifold valves to either the rear or bottom surface of the valve, internal passageways in the valve can be rearranged to avoid the need for a temporary access construction hole, the vent port can be advantageously located on the face surface of the valve where it can be readily connected to a drain conduit and, importantly, the overall height and cross-sectional area, and accordingly the manufacturing cost, of the valve can be dramatically reduced.

Figure 12:
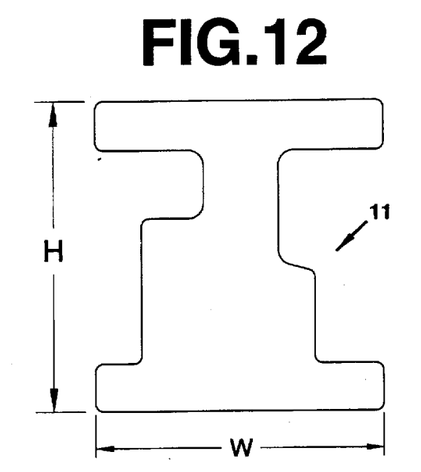
FIG. 12 is a profile view of the cast or extruded blank from which the manifold valve, shown in FIG. 1, representing the first configuration of the preferred embodiment of the present invention, is machined.
Figure 13:
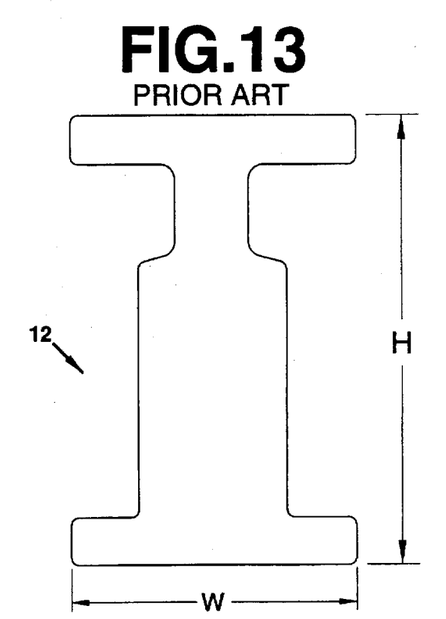
FIG. 13 is a profile view, drawn to the same scale as the manifold valve in FIG. 12, showing the outline of the cast or extruded shape required for manufacture of the prior art counterpart of the manifold valve shown in FIG. 12.
Figure 14:
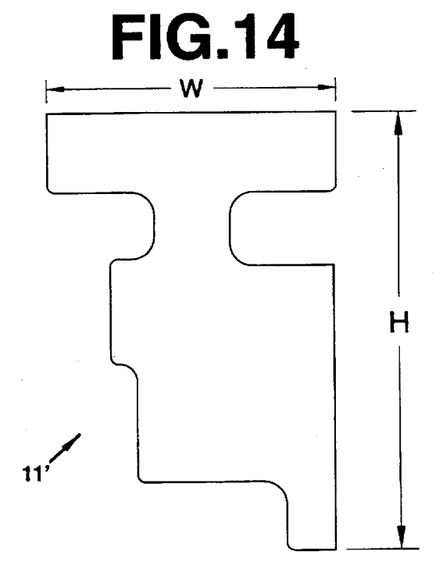
FIG. 14 is a profile view of the cast or extruded blank from which the manifold valve, shown in FIG. 6, representing the second configuration of the preferred embodiment of the present invention, is machined.
Figure 15:
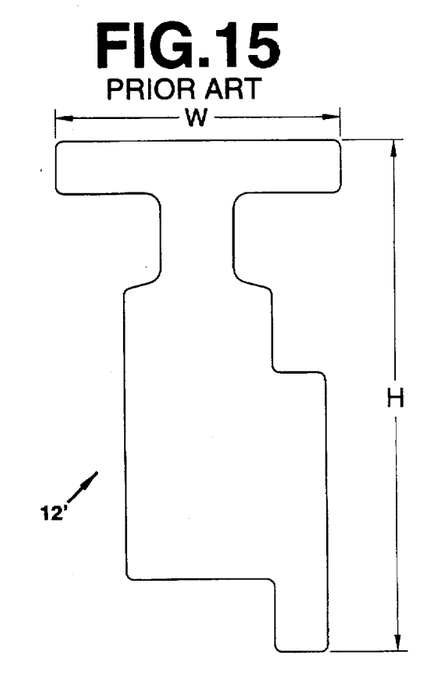
FIG. 15 is a profile view, drawn to the same scale as the manifold valve in FIG. 14, showing the outline of the cast or extruded shape required for manufacture of the prior art counterpart of the manifold valve shown in FIG. 14.

The preferred embodiments of the present invention are presented herein in association with two configurations of five valve, flanged manifold valves. In the first configuration, illustrated in FIGS. 1–5, a manifold valve 10 is arranged with parallel flanges and straight internal primary flow passageways. In the second configuration, illustrated in FIGS. 6–11, a manifold valve, designated 10', has the flanges formed at right angles with each other, and the internal primary flow passageways have a 90° bend, or turn, between the inlet and outlet ports of the valve. FIGS. 12 and 14 show the respective outline, or profile shapes, 11,11' of the extrusions from which the manifold valves 10,10' are machined. By way of comparison, the respective outlines 12,12' of the extrusions used in the manufacture the prior an manifold valves is graphically illustrated, at the same respective scale as the profiles shown in FIGS. 12 and 14, in FIGS. 13 and 15. The reduction in cross-sectional area of the extruded shape, attributable to the present invention, is 23 percent for the straight manifold valve 10, and 17.5 percent for the 90° manifold valve 10'. Thus, because the cross-sectional area of the initial blank is uniform throughout its length, the total mass of the blank from which the valves are machined is also reduced 23 percent and 17.5 percent respectively. This significant reduction in material requirements is accomplished without compromising any of the flow control functions of the valve and, by way of improved function, has a shorter fluid flow path through the valve and the vent port is conveniently disposed on the face, or front, surface 14 where it can be easily connected to a drain line.

In carrying out the present invention, the straight-flow manifold valve 10 has a body portion 14 comprising a front surface 16, a rear surface 18, a left side (as viewed from the front) surface 20, and a right side surface 22. As can be readily seen in FIG. 1—4, the left and right side surfaces 20,22 are parallel with each other. Five flow control valves, to be described in more detail later, are operatively positioned in the body portion 14.

Figure 4:
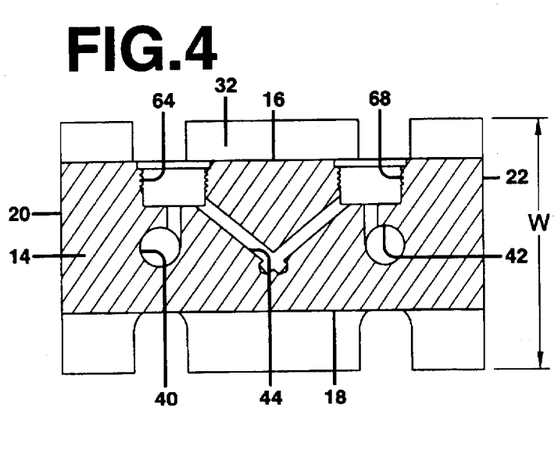
FIG. 4 is a cross-sectional view of the manifold valve embodying the present invention, taken along the line 4—4 of FIG. 3.

The manifold valve 10 also has a process flange 24 that is integrally formed with the body portion 14, i.e., it is an integral part of the extruded or cast shape from which the manifold valve is machined, and is adapted to removably secure the manifold valve 10 to a flange or other adapter of a fluid process system, not shown. The process flange 24 has a substantially planar surface 26 with a first inlet port 28 and a second inlet port 30 formed in the planar surface 26. The width of the process flange, represented by the letter w in FIGS. 4, 5, and 12, is measured in a direction parallel with the side surfaces 20,22 and perpendicular to the front, or face, surface 16 of the body portion 14, and defines the width of the manifold valve 10.

The manifold valve 10 also has an instrument flange 32 that is parallel with the process flange 24 and is likewise integrally formed with the body portion 14 of the manifold valve 10. The instrument flange 32 is typically adapted to provide a mounting surface for a test instrument such as a pressure transducer, not shown, on the manifold valve 10. The instrument flange 32 has a substantially planar surface 34 with a first outlet port 36 and a second outlet port 38 formed in the planar surface 34. The center-to-center spacing of the outlet ports 36,38 can be varied, as required, to accommodate the inlet port spacing of specific test instrument. Alternatively, a conventional coplanar adapter, not shown, can be installed between the instrument flange 32 of the manifold valve 10 and the mounting flange of the test instrument if the respective ports of the manifold valve 10 and the test instrument are not mutually aligned. Typically, the width of the instrument flange 32 is the same as that of the process flange 24, both being constructed to the same industry standard width for a particular use application.

Figure 3:
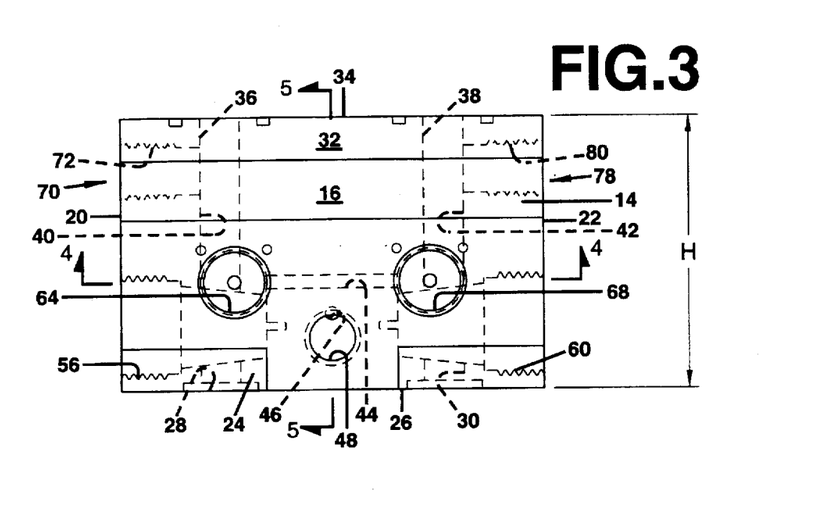
FIG. 3 is a front view of the manifold valve shown in FIG. 1, with the flow control valves and test port plugs removed to show details of the internal passageways in the manifold valve.
Figure 5:
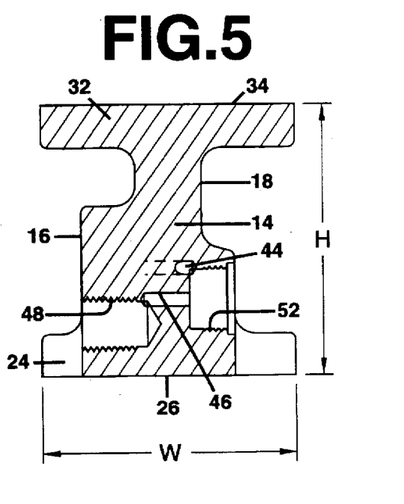
FIG. 5 is a transverse cross-sectional view of the manifold valve embodying the present invention, taken along the line 5—5 of FIG. 3.
Figure 6:
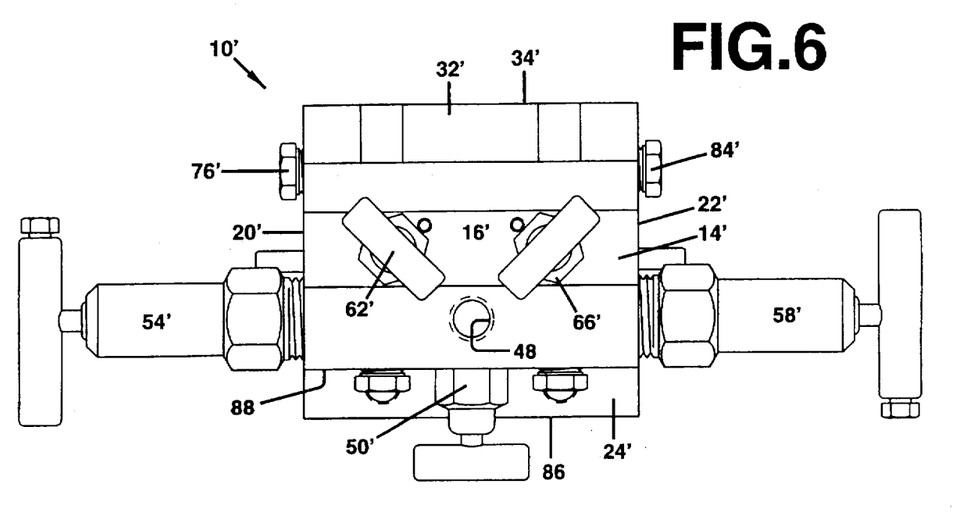
FIG. 6 is a front elevational view of the manifold valve, arranged to turn the flow of fluid 90° through the valve, representing a second configuration of the preferred embodiment of the present invention.
Figure 7:
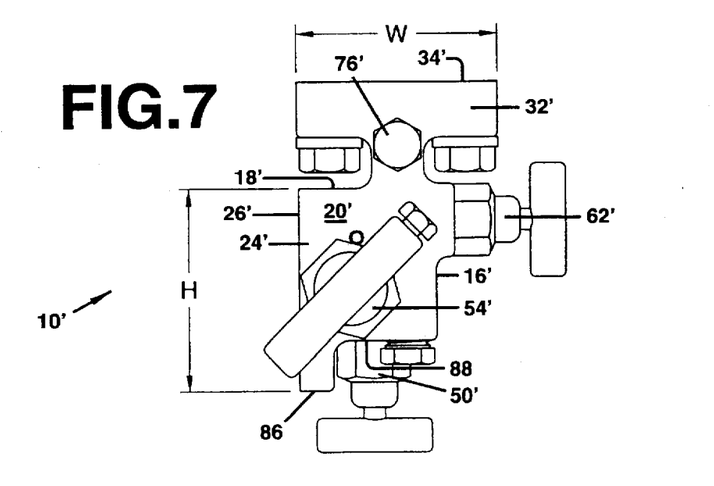
FIG. 7 is a left side view of the manifold valve, embodying the present invention, shown in FIG. 6.
Figure 8:
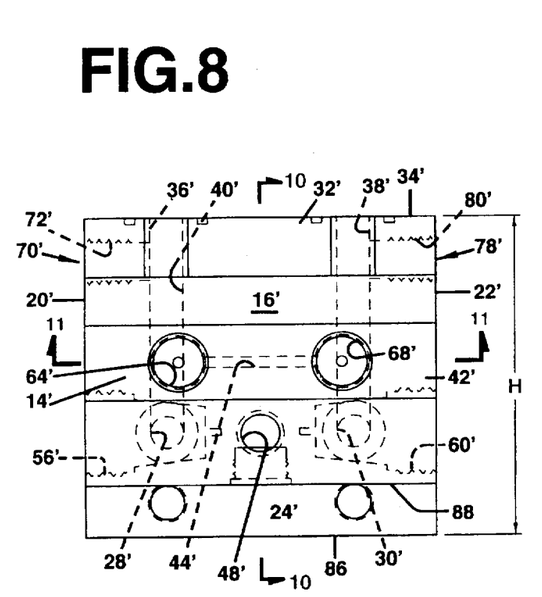
FIG. 8 is a front view of the manifold valve shown in FIG. 6, with the flow control valves and test port plugs removed to show details of the internal passageways in the manifold valve.
Figure 9:
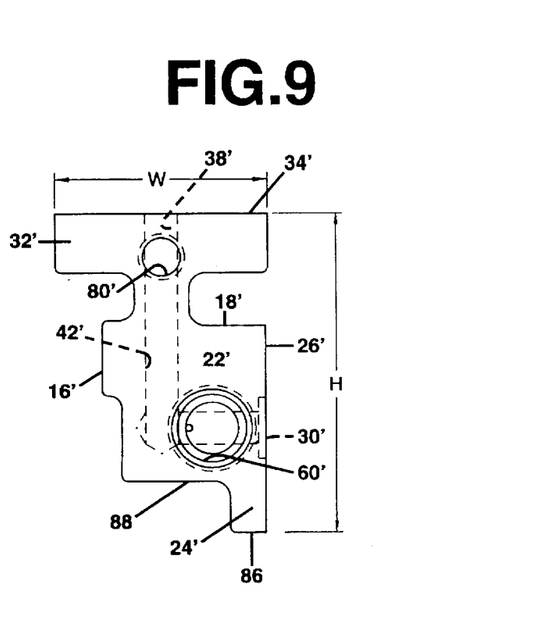
FIG. 9 is a right side view of the manifold valve shown in FIG. 6, with the flow control valves and test port plugs removed to show details of the internal passageways in the manifold valve.
Figure 10:
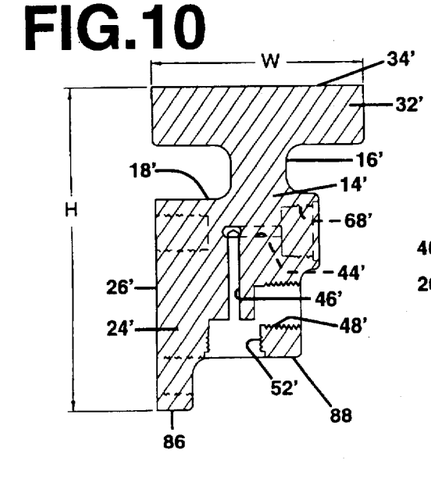
FIG. 10 is a transverse cross-sectional view of the manifold valve embodying the present invention, taken along the line 10—10 of FIG. 8.
Figure 11:
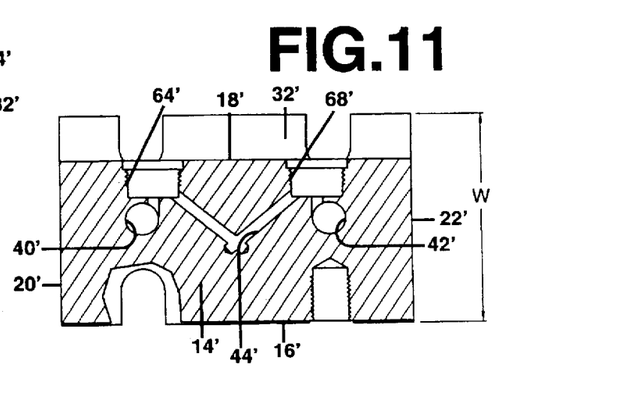
FIG. 11 is a cross-sectional view of the manifold valve embodying the present invention, taken along the line 11—11 of FIG. 8.

As can be in FIGS. 3, 5, and 12, the spacing between the respective planar surfaces 26,34 of the process flange 24 and the instrument flange 32, defines the overall height of the manifold valve 10, and is designated in those drawings by the letter H. In a representative example of the manifold valve 10 embodying the present invention, the height H of the valve is 2.60 in (6.60 cm), and the width W an industry standard 2.406 in (6.11 cm). Thus, the straight-flow flanged manifold valve 10 embodying the present invention has a height to width ratio of 1.08:1, i.e., the height of the valve 10 is only 8 percent greater than its width. Desirably, to achieve appreciable reduction in cross-sectional area and, accordingly, total material mass, the height to width ratio of the straight flow flanged manifold valve 10, embodying the present invention, is less than 1.25:1. By way of comparison, the prior art counterpart manifold valve 12 shown side-by-side in. 13 has an overall height H of 3.75 in (9.53 cm) which, with the same standard flange width W of 2.406 in (6.11 cm), yields a height to width ratio of 1.56:1. i.e, a height that is 56 percent greater than its width, and a cross-sectional area that is 23 percent greater than that of the manifold valve 10 embodying the present invention.

The manifold valve 10 embodying the present invention has a first primary flow passageway 40 that extends from the first inlet port 28 of the planar surface 26 of the process flange 24 to the first outlet port 36 on the planar surface 34 of the instrument flange 32. In like manner, the manifold valve 10 has a second primary flow passageway 42 that extends between the second inlet port 30 and the second outlet port 38. A crossover passageway 44 extends between the first and second primary flow passageways 40,42 and further communicates with a vent passage 46 that connects the crossover passageway 44 with a vent port 48 advantageously positioned for easy access and connection on the front surface 16 of the body portion 14 of the manifold valve 10. As described briefly above, the vent port 48 is preferably threaded to accept either a pipe connection or a threaded tubing adapter so that fluid drained from the vent port 48 can be conducted to an appropriate waste disposal container or system. Importantly, a vent control valve 50 is mounted in a threaded opening 52 on the rear surface 18 of the body portion 14, and has a closure element that, when moved to a closed position at the bottom of the opening 52, will block the flow of fluid from the crossover passageway 44 to the vent port 48.

A first isolation, or blocking, valve 54 is mounted in a threaded opening 56 formed in the left side surface 20, and has a closure element that is movable to a closed position at which it blocks flow through the first primary flow passageway 40. In similar fashion, a second isolation valve 58 is mounted in a threaded opening 60 in the right side surface 22, and has a closure element that is movable to a position at which it blocks flow through the second primary flow passageway 42. A first crossover valve 62 is mounted in a threaded opening 64 on the face, or front surface, 16 and has a closure element that, when closed, blocks the flow of fluid from the first primary flow passageway 40 to the crossover passageway 44. A second crossover valve 66 is likewise mounted in a threaded opening 68 provided on the front surface 16, and has a closure element that is movable to a closed position at which it blocks the flow of fluid between the second primary flow passageway 42 to the crossover passageway 44.

Importantly, all of the internal passageways can be drilled without the requirement for an otherwise unnecessary construction hole. For example, the vertically disposed primary flow passageways 40,42 can be drilled straight through from either flange surface 26,34. The crossover passageway 44 is formed by drilling intersecting holes that angle inwardly, as best shown in FIGS. 4 and 5, from each of the threaded openings 64,68. The vent passage 46 is easily formed by drilling a horizontal hole from the threaded opening 52 to the crossover passageway 44.

Figure 1:
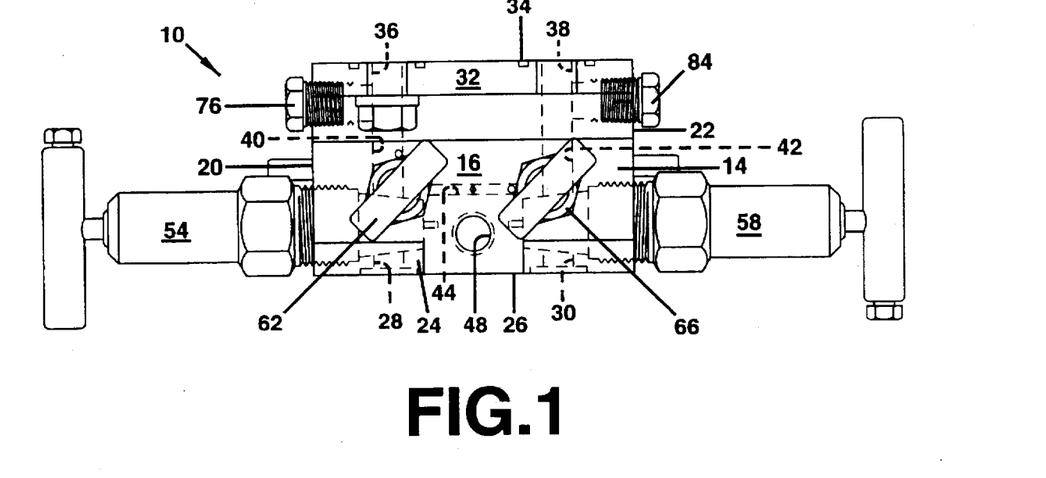
FIG. 1 is a front elevational view of the manifold valve, arranged to provide a straight flow of fluid through the valve, representing one configuration of the preferred embodiment of the present invention.
Figure 2:
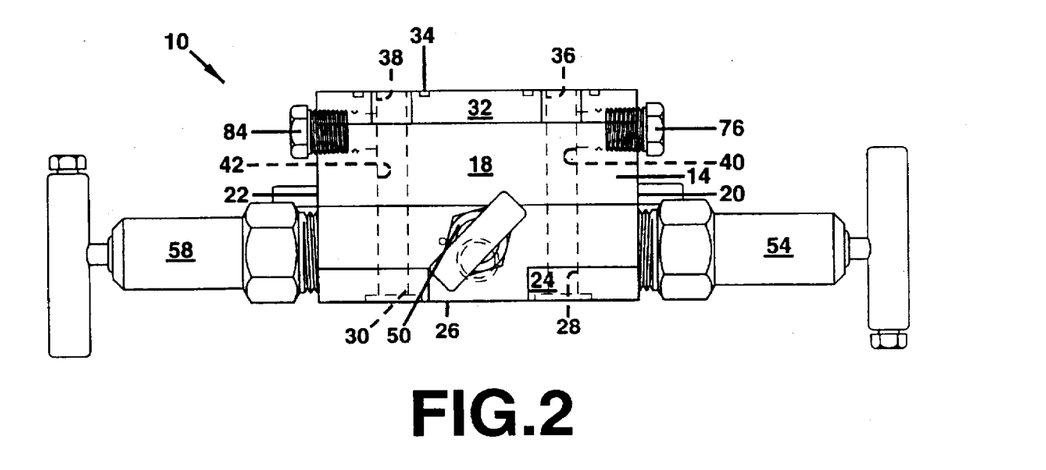
FIG. 2 is a rear view of the manifold valve, embodying the present invention, shown in FIG. 1.

If desired, test ports may be conveniently formed partially within the side surfaces of the instrument flange 32. As shown in FIGS. 1–3, a first test port 70 has a threaded opening 72 in the left side surface of the instrument flange 32 that communicates with the first primary flow passageway 40 and is sealed by a standard pipe plug 76 which can be easily removed if needed for connection with a known pressure for instrument calibration purposes. Similarly, a second test port 78 has a threaded opening 80 in the right side surface of the instrument flange surface 22 and provides fluid flow access to the second primary flow passageway 42. The second test port 78 similarly is also normally sealed by a conventional removable plug 84.

The alternative configuration of the preferred embodiment of the present invention is directed to a 90° tanged manifold valve, designated in the drawings by the reference numeral 10'. In many aspects, the function and construction of the alternative manifold 10' is identical, and in other aspects at least similar, to the above described straight-flow tanged manifold valve 10. For the sake of convenience, understanding, and the avoidance of undue repetition of nonessential detail, elements of the 90° manifold valve 10' that have equivalent counterparts in the earlier described straight manifold valve 10 are indicated by the same reference numerals with a prime mark (') added to distinguish between the two configurations.

The prime difference between the two manifold valves, 10,10' is that the 90° valve 10', as its name implies, is adapted to turn the fluid flow 90° between the inlet ports 28',30' and the outer ports 36',38', and the process flange 24' is thus positioned in an orthogonal relationship, i.e., at a right angle, with respect to the instrument flange 32'. In this configuration, the process flange 24' is contiguous with the rear surface 18' of the valve 10', and has a bottom edge surface 86 that extends downwardly from a bottom surface 88 of the body portion 14'. Thus, in this arrangement, the overall height of the manifold valve 10' is determined, or defined, by the distance between the planar surface 34' of the instrument flange 32' and the bottom edge surface 86 of the process flange 24'. In the 90° configuration, the tanged manifold valve 10' embodying the present invention has a defined height H, as shown in FIGS. 7–10 and 14, of 3.45 in (8.76 cm). The width W of the 90° manifold valve 10', either constructed according to the present invention or the prior art, is determined by the width of the adopted standard flange dimensions, which in the above described exemplary use application is 2.406 in (6.11 cm). Thus, the 90° manifold valve 10' embodying the present invention has a height to width ratio of 1.44:1, i.e., the height of the valve 10' is 44 percent greater than its width. Desirably, to achieve appreciable reduction in cross-sectional area and, accordingly, total material mass, the height to width ratio of the 90° manifold valve 10' embodying the present invention is less than 1.5:1. In marked contrast, the prior art counterpart manifold valve 12', shown in equal scale in FIG. 15, has an overall height H of 4.3 in (10.9 cm) which, with the same standard flange width W of 2.406 in (6.11 cm), yields a height to width ratio of 1.79:1. or a height that is 79 percent greater than its width, and a cross-sectional area that is 17.5 percent greater than that of the 90° manifold valve 10' embodying the present invention.

Importantly, in the 90° manifold valve 10', the vent port outlet 48' is located at a same desirable position on the front surface 16' of the body portion 14' as in the above-described straight flow configuration. In this arrangement, the vent control valve 50' is positioned on the bottom surface 88 of the body portion 14' to avoid interference with the process flange 24'. Advantageously, as can be readily seen from a study of FIGS. 8–11, all of the interconnecting internal passageways can be readily drilled without the requirement for a superfluous access hole as required in the counterpart prior art construction.

Thus, it can be readily understood that the differences between the tanged manifold valves 10,10' embodying the present invention and the prior manifolds of the same type are fundamental differences in the structure of the valve. The discovery that relocation of the vent ports 48,48' to the front face surface 16,16' of the valve, and relocation of the vent control valve to either the rear surface 18, or bottom surface 88 of the respective body portions 14,14', has eliminated the need for troublesome access holes that were necessary formed at extra cost in order to provide the interconnecting internally disposed fluid passages. Also, a surprising and welcome benefit is the significant reduction is material requirements, i.e., from 17.5 to 23 percent, over the prior art valve constructions.

INDUSTRIAL APPLICABILITY

The use of five valve flanged manifold valves, is well known. Typically, the five valve flanged manifold valves are installed between a fluid process system and a test or measurement instrument, such as a pressure transducer. In this application, fluid from each side of an orifice, i.e., the upstream and downstream sides of the orifice, are separately conducted, by way of the primary flow passageways 40,40', 42,42', to a respective designated side of the test instrument. The sensed pressure is used to calculate flow rates for process control and production purposes. It has been found that it is highly desirable that the flow path from the orifice to the sensor be a short as possible to minimize the influence of transient pressure anomalies on the measured pressure values and the resultant flow calculations. For that reason, the low profile, compact manifold valve 10,10' embodying the present invention is particularly useful in such applications because it provides a shorter fluid flow path between the pressure source and the measurement sensor. The crossover valves 62,62',66,66', the vent control valve 50,50', and the test ports 70,70',78,78' are used during testing and calibration of the measurement instrument, in accordance with established procedures, to controllably direct a selected source of pressure to a selected side of the test instrument.

Furthermore, the five valve flanged manifold valve 10,10' embodying the present invention has the vent port 48,48' conveniently located on the face of the valve, enabling easy connection to a threaded pipe, a threaded tubing adapter, or other conduit adapted to carry the vented fluid to an appropriate disposal storage container or apparatus, such as a bum stack commonly used in petroleum refining processes.

Other aspects, features and advantages of the present invention can be obtained from a study of this disclosure with the appended claims.

What is claimed is:

1. A manifold valve, comprising:
    a body portion having a front surface, a rear surface, two side surfaces disposed in substantially parallel relationship with each other, and at least five flow control valves operatively disposed within said body portion;
    a process flange integrally formed with said body portion and having a substantially planar surface with a first inlet port and a second inlet port disposed therein, said process flange having a predetermined width extending in a direction parallel with the side surfaces and perpendicular to the front surface of said body portion, said width defining the width of said manifold valve;
    an instrument flange integrally formed with said body portion and having a substantially planar surface with a first outlet port and a second outlet port disposed therein, said planar surface of the instrument flange being disposed in a predetermined spaced substantially parallel relationship with the planar surface of said process flange, said spaced relationship defining the height of said manifold valve, said width of said manifold 25 percent greater than the width of said manifold valve;
    a first primary flow passageway extending between said first inlet port and said first outlet port, a second primary flow passageway extending between said second inlet port and said second outlet port, a crossover passageway extending between said first primary flow passageway and said second primary flow passageway, a vent port disposed on the front surface of said valve and adapted to threadably receive a drain member therein, a vent passage extending between said crossover passageway and said vent port, and a vent passage control valve disposed on the rear surface of said body portion and having a closure element disposed in controllable flow blocking relationship with said vent passage;
    a first isolation valve disposed on a first one of the side surfaces of said body portion and having a closure element disposed in controllable flow blocking relationship with said first primary flow passageway, a second isolation valve disposed on the second one of the side surfaces of said body portion and having a closure element disposed in controllable flow blocking relationship with said second primary flow passageway; and
    a first crossover valve disposed on the front surface of said body portion and having a closure element disposed in controllable flow blocking relationship between said first primary flow passageway and said crossover passageway, and a second crossover valve disposed on the front surface of said body portion and having a closure element disposed in controllable flow blocking relationship between said second primary flow passageway and said crossover passageway.

2. A manifold valve, as set forth in claim 1, wherein said manifold valve has a first test port disposed at least partially within said instrument flange and in fluid communication with said second primary flow passageway.

3. A manifold valve, as set forth in claim 1, wherein said instrument flange has a predetermined width extending in a direction parallel with the side surfaces of said body portion, said predetermined width being substantially equal to the width of said process flange.

4. A manifold valve, comprising:
    a body portion having a front surface, a bottom surface, two side surfaces disposed in substantially parallel relationship with each other, and at least five flow control valves operatively disposed within said body portion;
    a process flange integrally formed with said body portion and having a substantially planar surface with a first inlet port and a second inlet port disposed therein, and a lower surface disposed in parallel spaced relationship with respect to the bottom surface of said body portion;
    an instrument flange integrally formed with said body portion and having a substantially planar surface with a first outlet port and a second outlet port disposed therein, said planar surface of the instrument flange being disposed in an orthogonal relationship with the planar surface of said process flange at a spaced distance from the lower surface of said process flange, said spaced distance defining the height of said manifold valve, and said instrument flange having a predetermined width extending in a direction parallel with the side surfaces and perpendicular to the front surface of said body portion and defining the width of said manifold valve, said height of the manifold valve being less than 50 percent greater than said width;

a first primary flow passageway extending between said first inlet port and said first outlet port, a second primary flow passageway extending between said second inlet port and said second outlet port, a crossover passageway extending between said first primary flow passageway and said second primary flow passageway, a vent port disposed on the front surface of said valve and adapted to threadably receive a drain member therein, a vent passage extending between said crossover passageway and said vent port, and a vent passage control valve disposed on the bottom surface of said body portion and having a closure element disposed in passage blocking relationship within said vent passage;

a first isolation valve disposed on a first one of the side surfaces of said body portion and having a closure element disposed in controllable flow blocking relationship with said first internal passageway, a second isolation valve disposed on the second one of the side surfaces of said body portion and having a closure element disposed in controllable flow blocking relationship with said second internal passageway; and, a first crossover valve disposed on the front surface of said body portion and having a closure element disposed in controllable flow blocking relationship between said first primary flow passageway and said crossover passageway, and a second crossover valve disposed on the front surface of said body portion and having a closure element disposed in controllable flow blocking relationship between said second primary flow passageway and said crossover passageway.

5. A manifold valve, as set forth in claim 4, wherein said manifold valve has a first test port disposed at least partially within said instrument flange and in fluid communication with said first primary flow passageway, and a second test port disposed at least partially within said instrument flange and in fluid communication with said second primary flow passageway.

* * * * *